(12) United States Patent
Kleen et al.

(10) Patent No.: US 7,909,203 B1
(45) Date of Patent: Mar. 22, 2011

(54) COOKING APPARATUS AND CONTAINER SYSTEM

(76) Inventors: Steven R. Kleen, Menifee, CA (US);
Samantha K. Kleen, Manifee, CA (US)

( * ) Notice: Subject to any disclaimer, the term of this patent is extended or adjusted under 35 U.S.C. 154(b) by 832 days.

(21) Appl. No.: 11/870,258

(22) Filed: Oct. 10, 2007

(51) Int. Cl.
*A47G 19/22* (2006.01)
*A47J 27/00* (2006.01)
*A45C 11/20* (2006.01)

(52) U.S. Cl. .................. 220/759; 220/573.1; 206/546

(58) Field of Classification Search ............ 220/573.1, 220/573.4, 697, 735, 736; 206/546, 547, 206/218, 541, 549, 209
See application file for complete search history.

(56) References Cited

U.S. PATENT DOCUMENTS

| | | | | |
|---|---|---|---|---|
| 42,535 | A | * | 4/1864 | Jackson ............... 206/546 |
| 2,329,422 | A | * | 9/1943 | Skerfving et al. ....... 206/546 |
| 5,133,476 | A | * | 7/1992 | Schutz ............... 220/622 |
| 5,705,212 | A | * | 1/1998 | Atkinson ............ 426/115 |
| 6,343,709 | B1 | | 2/2002 | DeForrest et al. |
| 6,359,218 | B1 | * | 3/2002 | Koch et al. ............ 174/50 |
| 7,128,233 | B2 | | 10/2006 | Hogan |
| 7,624,893 | B2 | * | 12/2009 | Hoff et al. ............ 220/753 |

OTHER PUBLICATIONS

Wild Ideas, Inc.; (www.wild-ideas.net/index2.html); 2003; Santa Ynez, CA 93460.
Bearvault; (www.bearvault.com); 2003; Jamie Hogan; San Diego, CA 92111.
Backpackers' Cache; (www.backpackerscache.com); 2002; Garcia Machine; Visalia, CA 93292.
Wild Ideas, Inc., website (available at http://wild-ideas.net/index2.html).
Bearvault, website (available at http://bearvault.com/).
Backpackers' Cache, website (available at http://backpackerscache.com/).

* cited by examiner

*Primary Examiner* — Anthony Stashick
*Assistant Examiner* — Shawn M Braden
(74) *Attorney, Agent, or Firm* — Neustel Law Offices (57) ABSTRACT

A cooking apparatus and container system for efficiently providing a portable container to secure multiple items within. The cooking apparatus and container system generally includes a container including an upper opening and a cavity, wherein the upper opening extends through an upper end of the container and wherein the chamber extends from the upper opening and within the container. A cap is removably secured to the container over the upper opening, wherein the cap is comprised of a configuration to seal the upper opening of the container. A handle is also included, wherein the handle may be secured in a storage position or a cooking position. The handle is secured adjacent the container in the storage position and the handle is secured to the cap in the cooking position.

1 Claim, 8 Drawing Sheets

COOKING APPARATUS AND CONTAINER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to containers and more specifically it relates to a cooking apparatus and container system for efficiently providing a portable container to secure multiple items within and that may also be utilized as a cooking apparatus (i.e. cooking pan).

2. Description of the Related Art

Any discussion of the related art throughout the specification should in no way be considered as an admission that such related art is widely known or forms part of common general knowledge in the field.

Sealable containers have been in use for years and are utilized for various purposes. One such purpose is to utilize the sealable containers during backpacking or various other outdoor activities. When backpacking for several days at a time, it is often necessary for an individual to bring along food and water to allow the individual to concentrate on backpacking and not on foraging for food and water. Because of the various wild animals (e.g. bears, etc.) within the wilderness that may smell the food carried by the backpacker, it is also often necessary that the individual store their food and water within a sealable and substantially indestructible container.

Containers utilized in the past to store food may be dissatisfying among individuals utilizing the containers for various reasons. One such reason is that the containers are generally heavy and difficult to carry over long distances. Another problem with prior containers is that the caps associated with the containers may be difficult to remove and cause the individual to tire while trying to open the container. Other problems with prior containers may be associated with the inadequate sizes of the container which force the individual to bring a smaller or larger container than necessary. Because of the inherent problems with the related art, there is a need for a new and improved cooking apparatus and container system for efficiently providing a portable container to secure multiple items within.

BRIEF SUMMARY OF THE INVENTION

The general purpose of the present invention is to provide a cooking apparatus and container system that has many of the advantages of the containers mentioned heretofore. The invention generally relates to a container which includes a container including an upper opening and a cavity, wherein the upper opening extends through an upper end of the container and wherein the chamber extends from the upper opening and within the container. A cap is removably secured to the container over the upper opening, wherein the cap is comprised of a configuration to seal the upper opening of the container. A handle is also included, wherein the handle may be secured in a storage position or a cooking position. The handle is secured adjacent the container in the storage position and the handle is secured to the cap in the cooking position.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a cooking apparatus and container system for efficiently providing a portable container to secure multiple items within.

Another object is to provide a cooking apparatus and container system that includes a cooking pan as an integral component of the container.

An additional object is to provide a cooking apparatus and container system that is lightweight.

A further object is to provide a cooking apparatus and container system that may be manufactured in various sizes.

Another object is to provide a cooking apparatus and container system that is substantially comprised of a transparent material to allow the individual to see within the container.

Another object is to provide a cooking apparatus and container system that includes a cap that is easily removable from the container.

Another object is to provide a cooking apparatus and container system that is substantially waterproof.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 8 illustrate a cooking apparatus and container system 10, which comprises a container 20 including an upper opening 32 and a cavity 69, wherein the upper opening 32 extends through an upper end of the container 20 and wherein the chamber 29 extends from the upper opening 32 and within the container 20. A cap 60 is removably secured to the container 20 over the upper opening 32, wherein the cap 60 is comprised of a configuration to seal the upper opening 32 of the container 20. A handle 50 is also included, wherein the handle 50 may be secured in a storage position or a cooking position. The handle 50 is secured adjacent the container 20 in the storage position and the handle 50 is secured to the cap 60 in the cooking position.

B. Container

The container 20 is preferably comprised of a strong, durable and substantially rigid configuration so as to be substantially indestructible from animals (e.g. bears, etc.) and from dropping the container 20. An example of a material utilized to construct the container 20 is plastic; however it is appreciated that the container 20 may be comprised of various materials rather than the preferred embodiment. The container 20 is also preferably comprised of a substantially lightweight material. The container 20 is preferably comprised of a transparent material so that the individual may easily view the contents of the container 20 without removing the cap 60.

Figure 1:
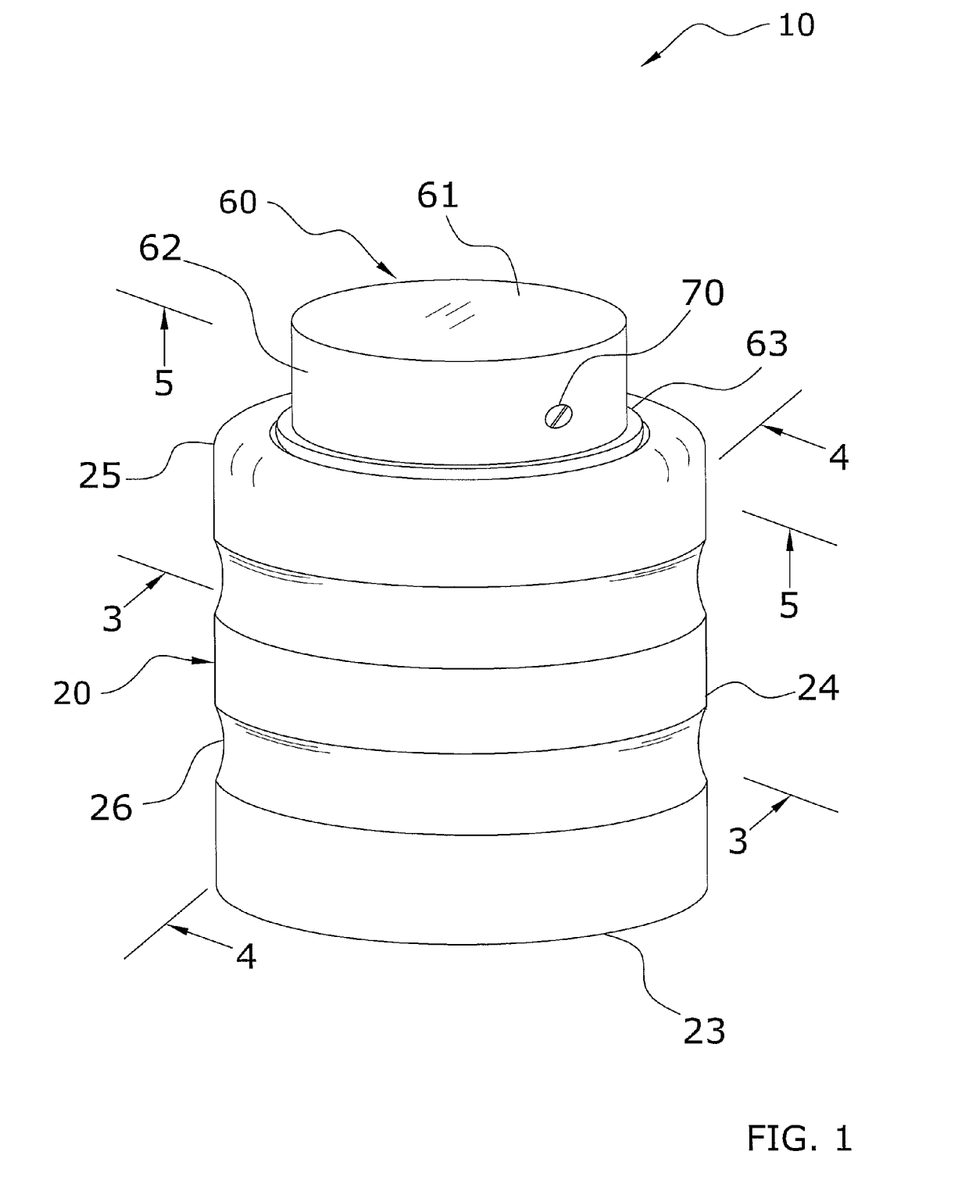
FIG. 1 is an upper perspective view of the present invention.
Figure 8:
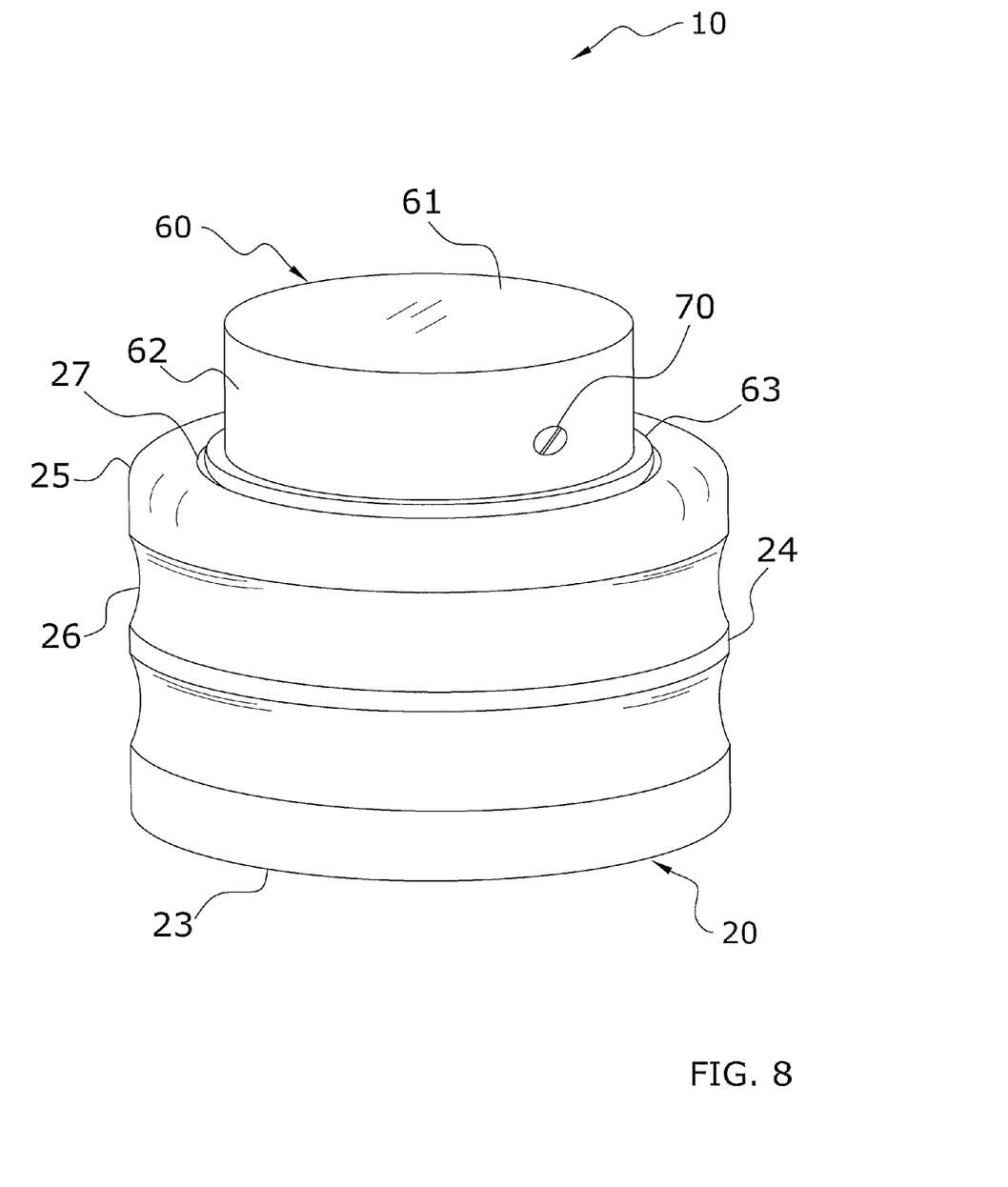
FIG. 8 is an upper perspective view of the present invention illustrating a different size container utilized on a similar size cap as in FIG. 1.

The container 20 may also be constructed of various sizes (e.g. large enough to hold supplies for 10 days, 5 days, 2 days, etc.) to accommodate various items positioned within the container 20 (e.g. food, clothing, etc.). It is appreciated that with varying sizes of the container 20, the cap 60 preferably remains the same size, wherein the container 20 simply lessens or lengthens in length as illustrated in FIGS. 1 and 8.

Figure 2:
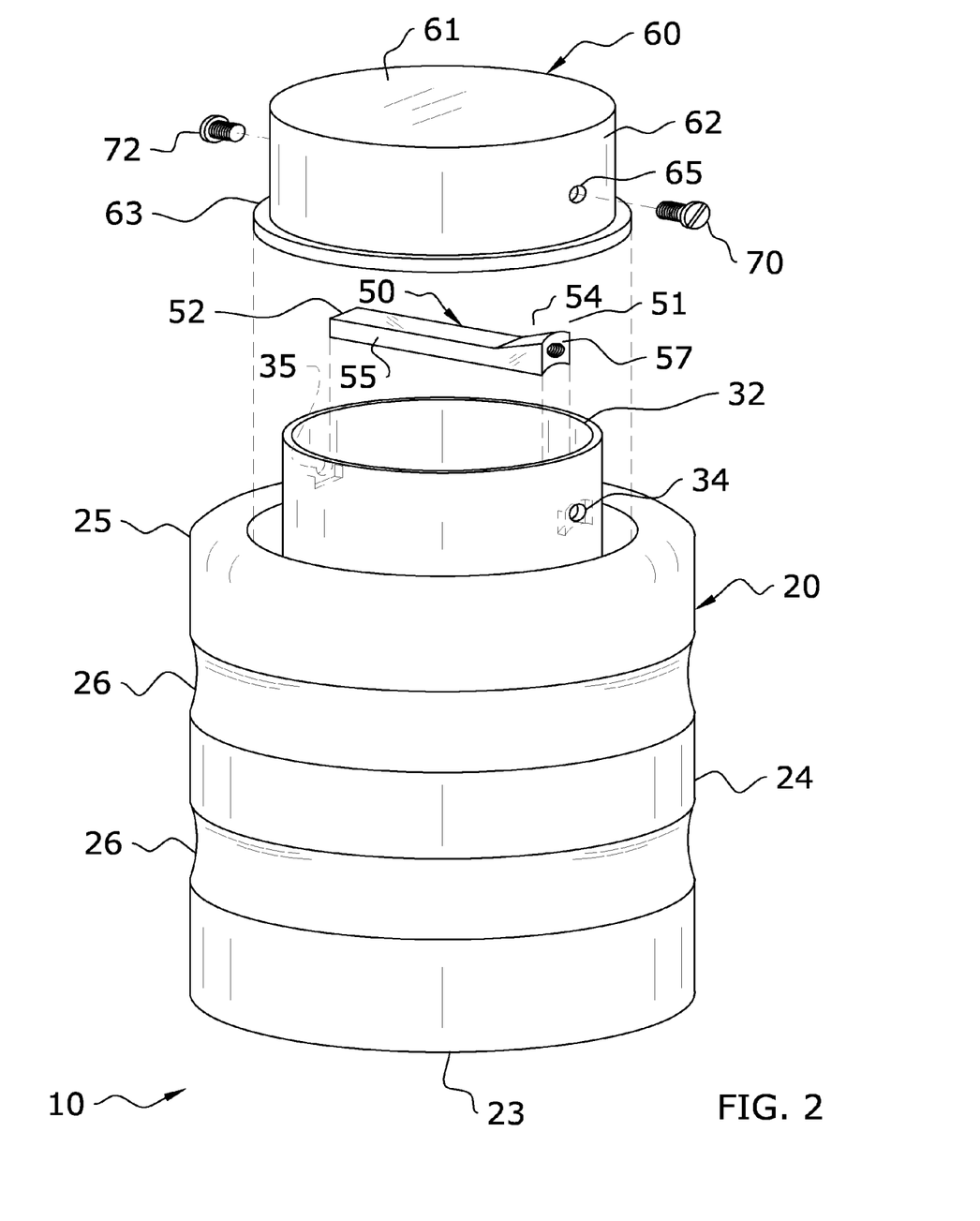
FIG. 2 is an exploded upper perspective view of the present invention.

The container 20 is preferably comprised of a cylindrical configuration; however it is appreciated that the container 20 may be comprised of various shaped configurations rather than the preferred embodiment, such as but not limited to square or rectangular. The container 20 includes a base portion 23 and a first sidewall portion 24 extending from a substantial perimeter of the base portion 23 as illustrated in FIGS. 1 and 2. The base portion 23 and the first sidewall portion 24 substantially define a chamber 29 within the container 20.

The container 20 also preferably includes at least one guide 26 extending around an outer surface of the first sidewall portion 24 as illustrated in FIGS. 1 through 4. The guides 26 are comprised of indentations extending around the first sidewall portion 24 and are utilized to secure a strap(s) to the container 20, wherein the strap is substantially prevented from sliding up and down when wrapped around the container 20 and positioned within the guides 26. The straps may also be configured to be worn in a backpack manner or around the waist of the individual. The straps may also be utilized to secure the container 20 to another object (e.g. tree, etc.).

Extending from the first sidewall portion 24 is a shoulder portion 25 of the container 20. The shoulder portion 25 preferably extends inwardly from the first sidewall portion 24 as illustrated in FIGS. 1 through 4. The shoulder portion 25 forms the substantial upper end of the chamber 29.

Extending outwardly from the shoulder portion 25 (and away from the base portion 23) is the neck 30 of the container 20. An upper groove 27 also preferably extends around the neck 30 between the neck 30 and the shoulder portion 25 toward the base portion 23. The upper groove 27 preferably receives the rim 63 of the cap 60 when the cap 60 is secured to the container 20. The neck 30 is preferably concentric with the container 20 and the base portion 23. The neck 30 is also preferably comprised of a substantially uniform diameter to slidably receive both the handle 50 within the inner side of the neck 30 and the cap 60 upon the outer side of the cap 60 as illustrated in FIGS. 1 through 5.

Figure 3:
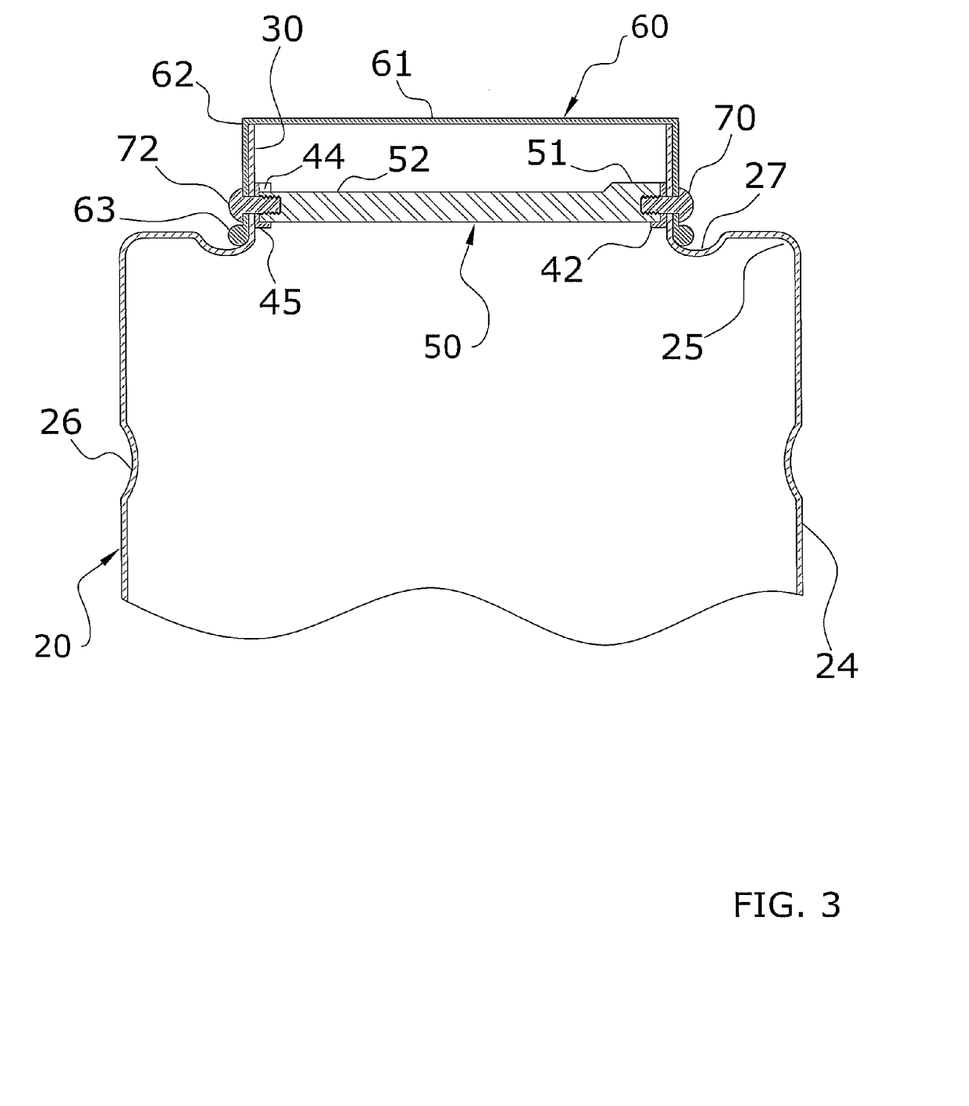
FIG. 3 is a cross-sectional view along line 3-3 of FIG. 1.
Figure 4:
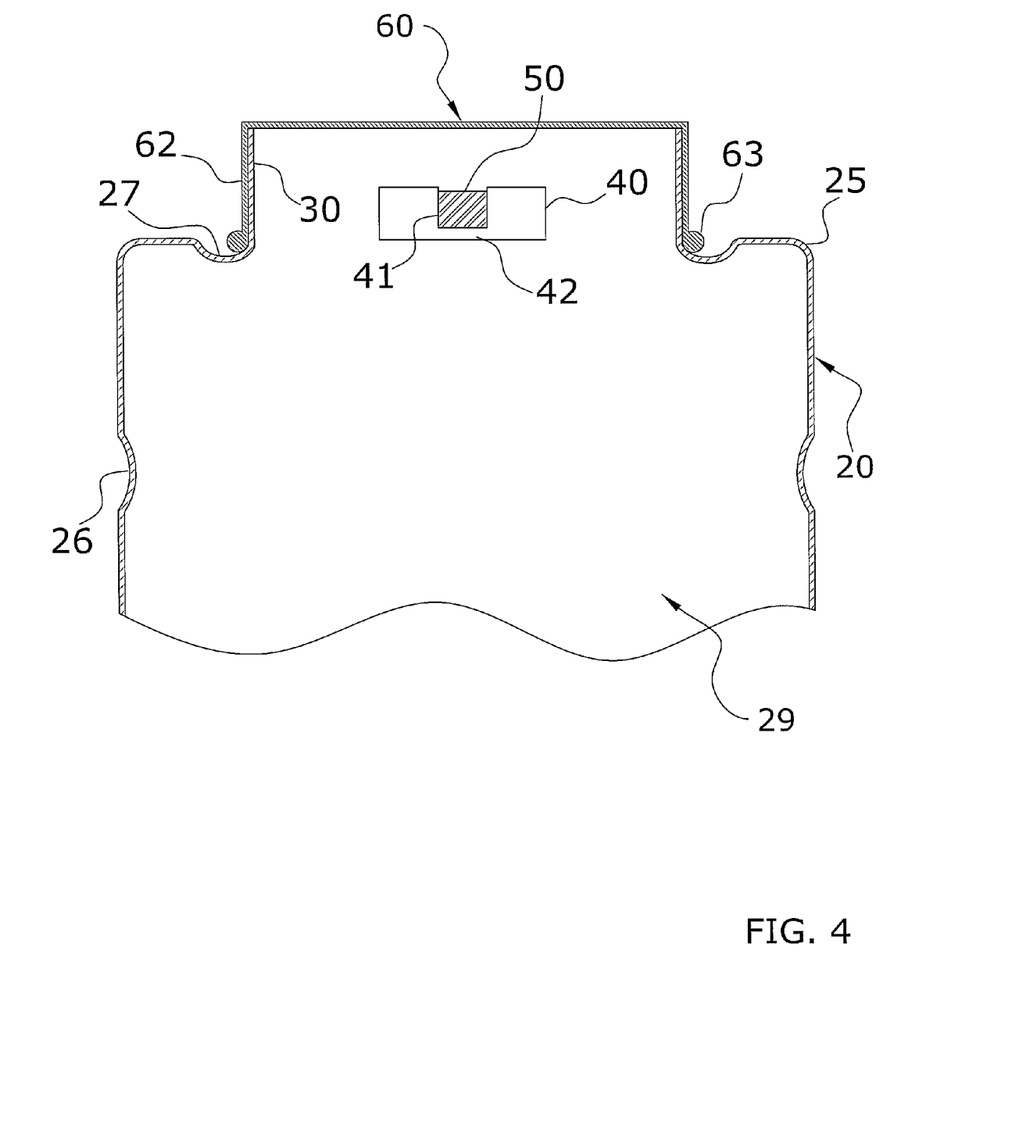
FIG. 4 is a cross-sectional view along line 4-4 of FIG. 1.

The upper opening 32 of the container 20 extends within the neck 30 and interconnects with the chamber 29 of the container 20, wherein the chamber 29 is accessed via the upper opening 32 as illustrated in FIGS. 3 and 4. The upper opening 32 is also preferably concentric with the neck 30. Extending within the side of the neck 30 is preferably a first neck opening 34 and a second neck opening 35, wherein the first neck opening 34 and a second neck opening 35 preferably extend from opposing sides of the neck 30.

The first neck opening 34 and a second neck opening 35 are comprised of a substantially similar diameter as the fasteners 70, 72 (e.g. bolt, screw, etc.), wherein the first neck opening 34 and a second neck opening 35 receive the fasteners 70, 72 when attaching the cap 60 to the neck 30 of the container 20 as illustrated in FIGS. 2 through 5. It is appreciated that the neck 30 may only include one opening neck opening 34, 35 rather than both the first neck opening 34 and a second neck opening 35 if only one fastener 70, 72 is needed to secure the handle 50 within the neck 30 of the container 20.

The container 20 also includes a first support 40 and a second support 43 to receive the handle 50 when the handle 50 is in the storage position. The first support 40 and the second support 43 are preferably positioned within the neck 30 of the container 20. The first support 40 and the second support 43 are positioned upon opposing inner sides of the neck 30 and are also aligned with the first neck opening 34 and a second neck opening 35. The first support 40 and the second support 43 are preferably integrally formed with the neck 30; however it is appreciated that the first support 40 and the second support 43 may be comprised of separate structures than the neck 30 and the container 20.

The first support 40 includes a first notch 41 and the second support 43 also includes a second notch 44, wherein the notches 41, 44 receive the first end 51 and the second end 52 of the handle 50. The notches 41, 44 are preferably comprised of substantially similar configurations (e.g. rectangular) as the ends 51, 52 of the handle 50, wherein the ends 51, 52 of the handle 50 may be securely positioned within the notches 41, 44 of the supports 40, 43.

The notches 41, 44 also extend into the supports 40, 43 from an upper end of the supports 40, 43 (adjacent the upper opening 32), wherein the handle 50 is slid within the neck 30 and onto the ledges 42, 45 formed between the notches 41, 44 and the supports 40, 43 as illustrated in FIGS. 2 through 5. The supports 40, 43 further preferably do not extend a substantial distance across the neck 30, wherein it is preferred that the supports 40, 43 do not block a passage of items in and out of the chamber 29 through the upper opening 32. It is appreciated that the first neck opening 34 and the second neck opening 35 further align with the first notch 41 and the second notch 44 respectively, wherein the first neck opening 34 extends through the portion of the first support 40 behind the first notch 41 and the second neck opening 35 extends through the portion of the second support 43 behind the second notch 44.

C. Handle

Figure 5:
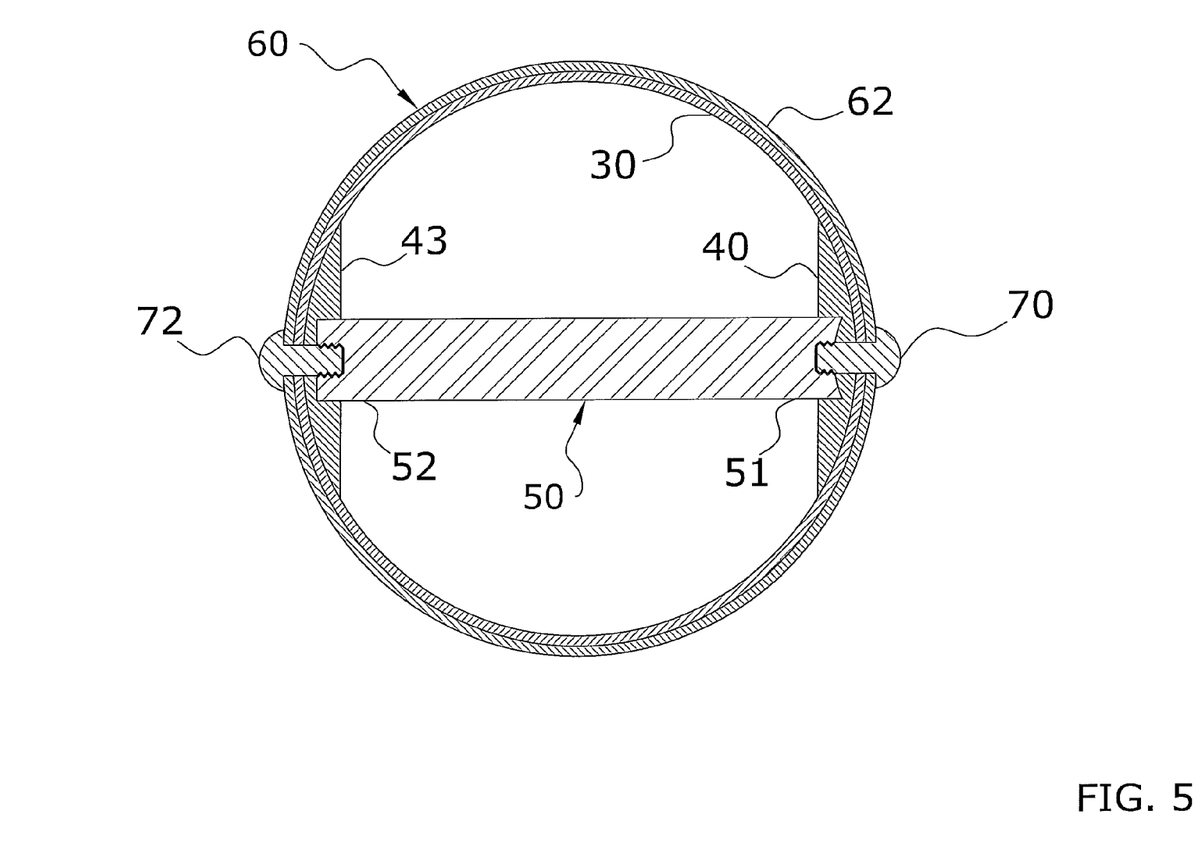
FIG. 5 is a cross-sectional view along line 5-5 of FIG. 1.
Figure 7:
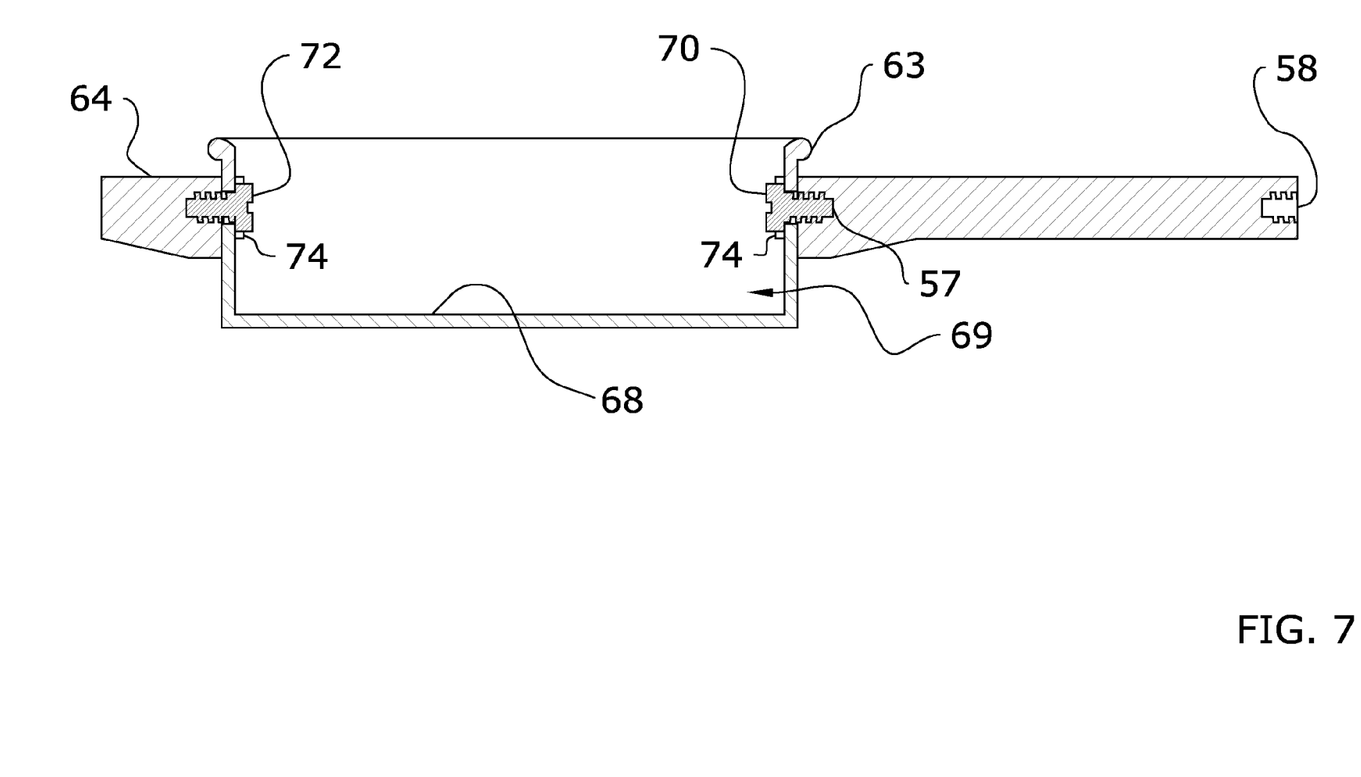
FIG. 7 is a cross-sectional view along line 7-7 of FIG. 6.

The handle 50 is attached to the cap 60 when utilizing the cap 60 as a cooking apparatus (e.g. pan, pot, etc.) as illustrated in FIGS. 7 and 8. The handle 50 is preferably comprised of an elongated configuration and also of a material that will not conduct heat very well, so as to prevent the handle 50 from becoming substantially hot while utilizing the cap 60 as a cooking apparatus. The length of the handle 50 is also substantially similar to the diameter of the inside of the neck 30 so as to be received within the neck 30 during the storage position as illustrated in FIGS. 2, 3 and 5.

The handle 50 includes a first end 51 and a second end 52 opposite the first end 51 as illustrated in FIGS. 2 and 3. Extending from the first end 51 towards the second end 52 is preferably the attachment portion 54. The attachment portion 54 preferably attaches to the perimeter of the second sidewall portion 62 of the cap 60. The first end 51 is preferably curved so as to securely attach to the cap 60, wherein the degree in which the first end 51 is curved is similar to the degree in which the second sidewall portion 62 of the cap 60 is curved adjacent the first cap opening.

A first handle opening 57 also extends within the first end 51 and the attachment portion 54. The first handle opening 57 is utilized in the cooking position of the handle 50 and also preferably during the storage position of the handle 50. The first handle opening 57 is preferably comprised of a threaded configuration and threadably receives the first fastener 70 via extending the first fastener 70 within the first cap opening 65 (from an inner side) and within the first handle opening 57 of the handle 50. It is appreciated that a washer 74 may also be utilized between the first fastener 70 and the cap 60 to form a substantially watertight seal around the first fastener 70. The washer 74 is preferably comprised of a resilient material, such as but not limited to rubber.

Extending from the attachment portion 54 of the handle 50 is the elongated portion 55, wherein the individual normally grasps the elongated portion 55 of the handle 50 when utilizing the handle 50. A second handle opening 58 also extends within the second end 52 and the elongated portion 55. The second handle opening 58 is generally only utilized when the handle 50 is in the storage position as illustrated in FIGS. 2 and 3. The second handle opening 58 is preferably comprised of a threaded configuration and threadably receives the second fastener 72 via extending the second fastener 72 within the, second neck opening 35, the second cap opening 66 and within the second handle opening 58 of the handle 50.

D. Cap

The cap 60 is preferably comprised of a strong, durable and substantially rigid configuration so as to be substantially indestructible from animals (e.g. bears, etc.) and from dropping the cap 60. An example of a material utilized to construct the cap 60 is metal; however it is appreciated that the cap 60 may be comprised of various materials rather than the preferred embodiment.

The material utilized to construct the cap 60 is also able to withstand excessive amounts of heat (e.g. from fires, stoves, etc.), wherein the cap 60 is also utilized as a cooking apparatus in addition to utilizing the cap 60 to seal the upper opening 32 and chamber 29 of the container 20. It is appreciated that the cap 60 slides over the outer perimeter of the neck 30 when in the storage position, wherein the inner diameter of the cap 60 is substantially similar to the outer diameter of the neck 30 as illustrated in FIGS. 2 through 5.

The cap 60 is preferably comprised of a cylindrical configuration; however it is appreciated that the cap 60 may be comprised of various shaped configurations rather than the preferred embodiment, such as but not limited to square or rectangular all which correspond with the configuration of the neck 30. The cap 60 includes an end wall portion 61 and a second sidewall portion 62 extending from a substantial perimeter of the end wall portion 61 as illustrated in FIGS. 3, 4, 6 and 7. The end wall portion 61 and the second sidewall portion 62 substantially define a cavity 69 within the cap 60.

Extending from the perimeter of the second sidewall portion 62 is a rim 63. The rim 63 preferably extends outwardly from the second sidewall portion 62 as illustrated in FIGS. 3, 4, 6 and 7. The rim 63 forms the lip of the cap 60 and also helps to secure the cap 60 to the neck 30 via extending within the upper groove 27 of the container 20.

Extending within the second sidewall portion 62 of the cap 60 is preferably a first cap opening 65 and a second cap opening 66, wherein the first cap opening 65 and a second cap opening 66 preferably extend from opposing sides of the cap 60. The first cap opening 65 and a second cap opening 66 are comprised of a substantially similar diameter as the fasteners 70, 72 (e.g. bolt, screw, etc.), wherein the first cap opening 65 and a second cap opening 66 receive the fasteners 70, 72 when attaching the cap 60 to the cap 60 of the neck 30 as illustrated in FIGS. 2 through 5. It is appreciated that the cap 60 may only include one cap opening 65, 66 rather than both the first cap opening 65 and a second cap opening 66 if only one fastener 70, 72 is needed to secure the cap 60 to the neck 30.

Figure 6:
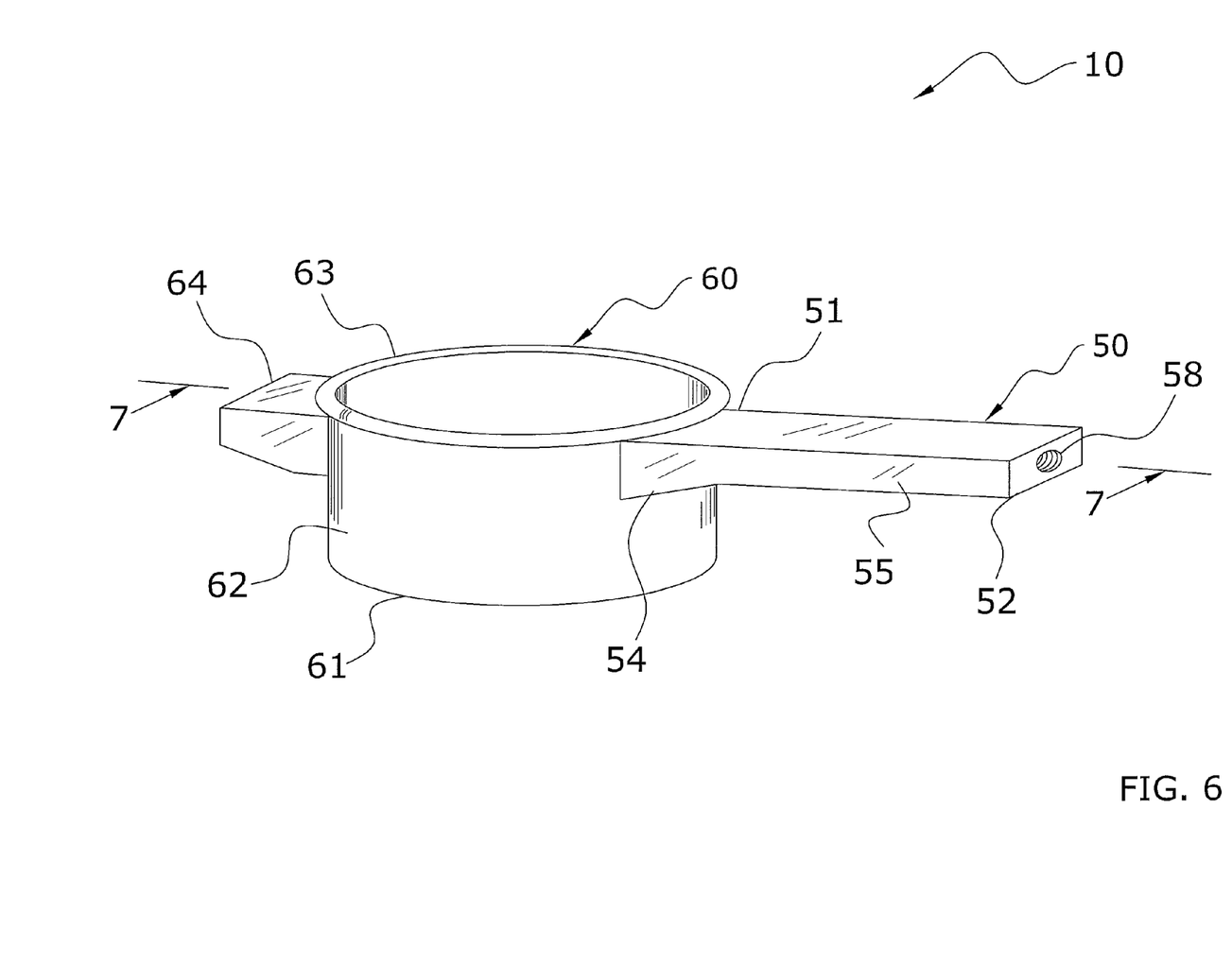
FIG. 6 is an upper perspective view of the cap configured as a cooking apparatus.

When utilizing the cap 60 as a cooking apparatus, the second fastener 72 is preferably extended within an attachment member 64 and associated threaded opening within the attachment member 64 to seal the second cap opening 66 as illustrated in FIGS. 6 and 7. A washer 74 may also be utilized to provide a watertight seal between the second fastener 72 and the cap 60 in a similar manner as utilized with the first fastener 70. It is appreciated that the first cap opening 65 and a second cap opening 66 are preferably positioned adjacent the rim 63 of the cap 60. The cap 60 may also include a "non stick" cooking surface 68 lining the inner surface of the cap 60 to prevent food or water from sticking within the cap 60 while utilizing the cap 60 as a cooking apparatus.

E. Operation of Preferred Embodiment

In use, the cap 60 and the handle 50 are first removed from the container 20 via removing the first fastener 70 and the second fastener 72 from the container 20 and slidably removing the handle 50 from the neck 30 through the upper opening 32 as illustrated in FIG. 2. The chamber 29 of the container 20 may now be filled with any desired items that are desired to be secured within the container 20.

After the chamber 29 is filled with all the desired items the cap 60 may be reattached to the neck 30 of the container 20. The handle 50 is first slid within the neck 30 (perpendicular to the neck 30) and positioned within the notches 41, 44 and upon the ledges 42, 45 of the supports 40, 43 as illustrated in FIGS. 3 through 5. The openings 57, 58 of the handle 50 are ensured to be aligned with the openings 34, 35 of the neck 30. The cap 60 may now be slid over the neck 30 and the openings 65, 66 of the cap 60 are subsequently aligned with the openings 34, 35 of the neck 30 and the handle 50. The fasteners 70, 72 may now be extended and threadably attached within each of the openings 34, 57, 65 and 35, 58, 66 thus securely closing the container 20.

To access items within the container 20, the previously described process is simply reversed. To utilize the cap 60 as a cooking apparatus the present invention is disassembled by reversing the previously described process and the attachment portion 54 and first handle opening 57 is aligned with the first cap opening 65. The first fastener 70 is now extended through a washer 74 and subsequently within the first cap opening 65 (from the inner side) and threadably attached within the first handle opening 57.

The handle 50 is now secured to the cap 60, thus forming a pot or pan that may be utilized for various cooking procedures (e.g. heating food, boiling water, etc.). To seal the second handle opening 58 of the handle 50, the second fastener 72 is extended through a washer 74 and subsequently within the second handle opening 58 (from the inner side) and threadably attached within the opening of the attachment member 64 as illustrated in FIG. 7.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. A cooking apparatus and container system, comprising:
a container including:
   a base portion;
   a first sidewall portion extending from said base portion, wherein said first sidewall portion and said base portion define a chamber;
   an upper portion extending from said first sidewall portion opposite said base portion;
   an upper opening extending within said upper portion, wherein said upper opening interconnects with said chamber; and
   at least one first opening extending within a side of said upper portion;
a cap including:
   an end wall;
   a second sidewall portion extending from said end wall, wherein said second sidewall portion and said end wall define a cavity; and
   at least one second opening extending within said second sidewall portion, wherein said at least one first opening and said at least one second opening are positionable in an aligned position;
wherein said cap is removable secured over said upper opening;
at least one fastener to connect said container to said cap, wherein said fastener extends through said at least one first opening and said at least one second opening;
a pair of supports positioned within said container, wherein said pair of supports include a pair of notches extending within said pair of supports; and
a handle to be secured in a storage position or in a cooking position;
wherein said handle is secured within said container and supported within said pair of notches of said supports in said storage position and wherein said handle is secured to said cap in said cooking position;
wherein a diameter of said upper opening and a length of said handle are similar.

* * * * *